United States Patent [19]
Antonson

[11] Patent Number: 4,541,207
[45] Date of Patent: Sep. 17, 1985

[54] PULL-APART MOUNTING HUB

[75] Inventor: Douglas M. Antonson, South St. Paul, Minn.

[73] Assignee: Flo-Pac Corporation, Minneapolis, Minn.

[21] Appl. No.: 577,385

[22] Filed: Feb. 6, 1984

[51] Int. Cl.⁴ .............................................. B24D 9/08
[52] U.S. Cl. ........................................ 51/376; 51/177; 15/230.17; 15/230.19; 403/261; 403/344; 24/90.5; 24/511; 411/509
[58] Field of Search .................... 51/170 T, 177, 358, 51/376, 377, 382, 383, 388, 391; 15/230.17, 230.19; 24/90.5, 511, 572; 403/256, 261, 344; 411/508, 509, 510, 182

[56] References Cited

U.S. PATENT DOCUMENTS

| 881,691 | 3/1908 | Hughes | 51/376 X |
|---|---|---|---|
| 2,995,765 | 8/1961 | Ballato et al. | 15/230 |
| 3,056,988 | 10/1962 | Clarke | 15/230 |
| 3,270,467 | 9/1966 | Block et al. | 51/358 |
| 3,436,875 | 4/1969 | Cheney | 51/376 |
| 3,451,093 | 10/1965 | McAleer | 15/230.1 |
| 3,462,889 | 8/1969 | Erickson | 51/380 |

FOREIGN PATENT DOCUMENTS 506319 12/1954 Italy ........................................ 51/177

Primary Examiner—Robert P. Olszewski
Attorney, Agent, or Firm—James R. Haller; Gregory P. Kaihoi

[57] ABSTRACT

A pull-apart mounting hub for mounting a scrubbing pad or the like to a drive disc on a power-driven scrubbing machine or the like. The hub has two parts: a base mounted to the drive disc, the base having a cylindrical collar and an annular shoulder; and a split-ring retainer. The split-ring retainer is resilient and generally cylindrical, and includes a retaining flange extending radially outwardly for retaining the pad, an annular lip engageable with the annular shoulder of the collar to lock the two pieces together, and a tab adjacent the split for urging the lip adjacent the split out of engagement with the annular shoulder of the collar to enable the retainer to be removed from the collar.

9 Claims, 7 Drawing Figures

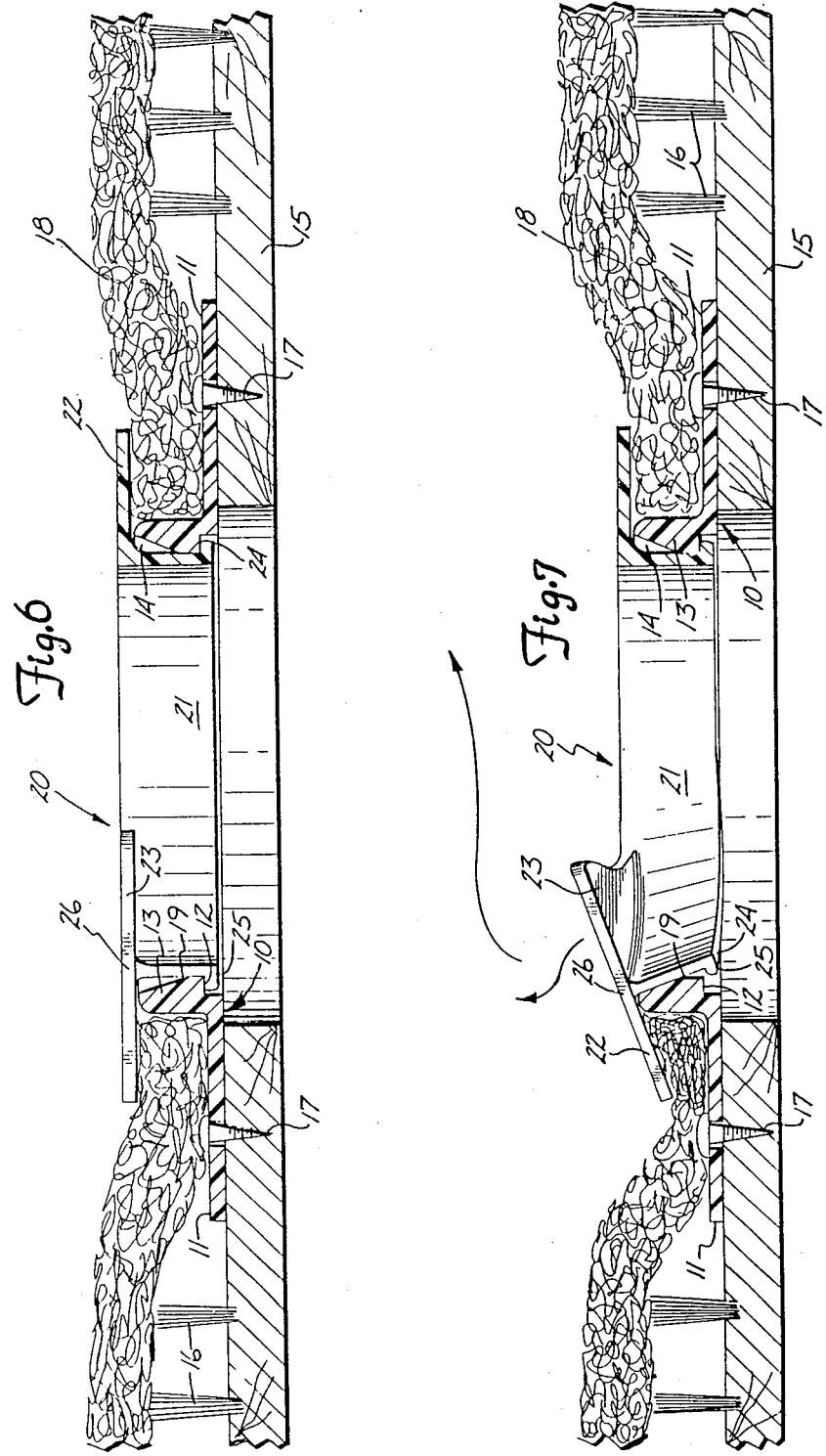

PULL-APART MOUNTING HUB

TECHNICAL FIELD

The invention relates to an improved mounting hub for mounting a pad or similar article to a power-driven base. The invention finds particular utility in the mounting of scrub pads and the like to power-driven floor scrubbing machines.

BACKGROUND ART

In the maintenance of hard surface floors a variety of power-driven implements have been utilized to facilitate scrubbing, cleaning, and polishing of relatively large areas. One popular machine for such maintenance work is a rotary scrubbing/buffing machine. Such machines generally include an electric motor, a handle extending at an angle upwardly toward the operator from a motor housing, and a scrubbing, polishing, burnishing or buffing disc attached to the motor drive shaft beneath the motor. Commonly the entire weight of the machine is supported by the rotating disc, the weight of the machine providing sufficient force to cause effective engagement of the disc with the floor surface.

In recent years, disposable abrasive scrubbing pads have become popular cleaning accessories. These pads are typified by the "SCOTCH-BRITE" brand scrubbing pad, a trademarked product of Minnesota Mining and Manufacturing Co. Such scrubbing pads are generally disc-shaped, having a thickness on the order of two to three centimeters. A mounting hub mounts the pad coaxially to a drive disc which is driven by the motor shaft. Typically the scrubbing pad has a center hole which engages a collar of the mounting hub, the hub having a retaining plate which is detachably mounted to hold the scrubbing pad in place.

Commonly, however, the scrubbing pad can only be replaced by substantial manual manipulation of the mounting hub, e.g., by removing a variety of screws or bolts which hold the mounting hub together, twisting of attachment lugs, etc. This procedure is time-consuming and inefficient, and the parts of such mounting hubs are prone to fail after extended use and misuse.

DISCLOSURE OF INVENTION

The present invention provides a pull-apart mounting hub for mounting a scrubbing pad or the like having a circular mounting hole to a drive disc on a power-driven scrubbing machine or the like. The hub is comprised of a base mountable coaxially to the drive disc and having a generally cylindrical collar with an annular shoulder formed therein, and a resilient, generally cylindrical, split-ring retainer which is removably attached to the base. The retainer has a cylindrical body, an annular lip engageable with the annular shoulder of the collar to lock the retainer to the collar, and manually operable tab means extending generally radially from the retainer adjacent the split for resiliently urging the annular lip adjacent the split out of engagement with the annular shoulder of the collar to enable the retainer to be removed from the collar.

The retainer and collar also desirably have respectively radially outwardly extending, generally parallel flanges spaced to receive between them the portion of the scrubbing pad adjacent its circular mounting hole when the retainer is locked to the collar.

In a preferred embodiment, the body of the retaining insert fits snugly within the collar of the base, and the inner surface of the base collar tapers radially outwardly in the direction away from the collar shoulder.

BRIEF DESCRIPTION OF DRAWINGS

FIG. 6 is a cross-sectional view of the mounting hub of FIG. 1, taken along line 6—6 thereof; and FIG. 7 is similar to FIG. 6, but shows the retaining insert being removed.

BEST MODE FOR CARRYING OUT THE INVENTION

It will be understood that although the disclosure relating to the mounting hub takes place in the context of mounting an abrasive scrubbing pad to a power-driven scrubbing machine, the hub may be utilized for a variety of applications unrelated to floor-scrubbing machines.

Figure 1:
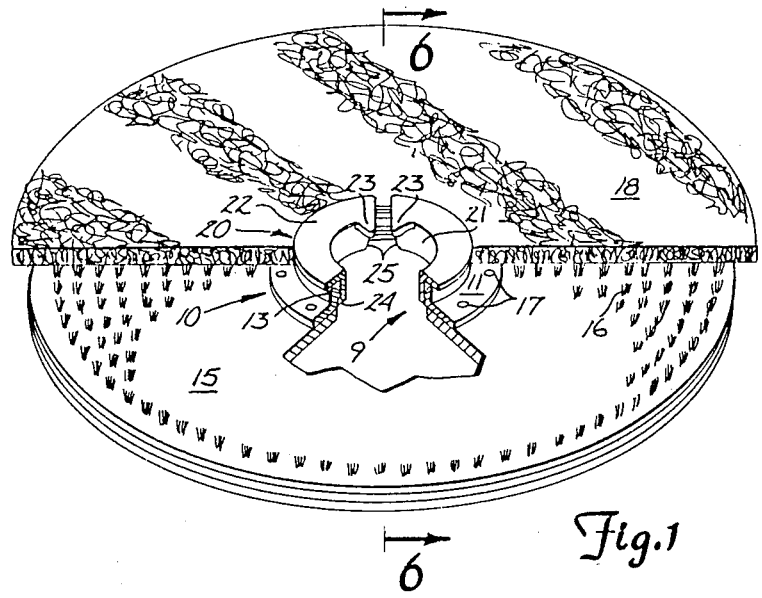
FIG. 1 is a perspective view in partial cross-section of a mounting hub of the invention shown attached to a drive disc, and with a scrub pad (in section) in place.

FIG. 1 depicts a pull-apart mounting hub, shown generally as (9), attached to a drive disc (15) which in turn is driven by the shaft of a motor (not shown). A scrub pad (18) having a central mounting hole is retained by the mounting hub (9) and supported by the drive disc (15). The drive disc (15) may include a plurality of bristles (16), the ends of which engage and support the scrub pad (18). A drive disc (15) of the type shown is desirably rigid and typically fabricated from plywood, aluminum, plastic, or similar material. It is equipped with means, not shown, for attachment to the drive shaft of a scrubbing machine.

The pull-apart mounting hub (9) is preferably comprised of two pieces, a base (10) which is attached to the drive disc (15), and a removable split-ring retainer (20) which includes a retaining flange (22) for retaining the scrub pad (18).

Figure 2:
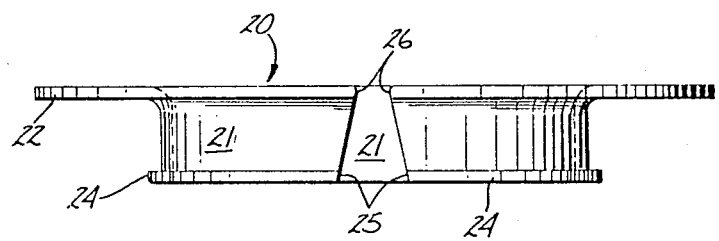
FIG. 2 is a side elevational view of a retainer employed in a mounting hub of the invention.
Figure 5:
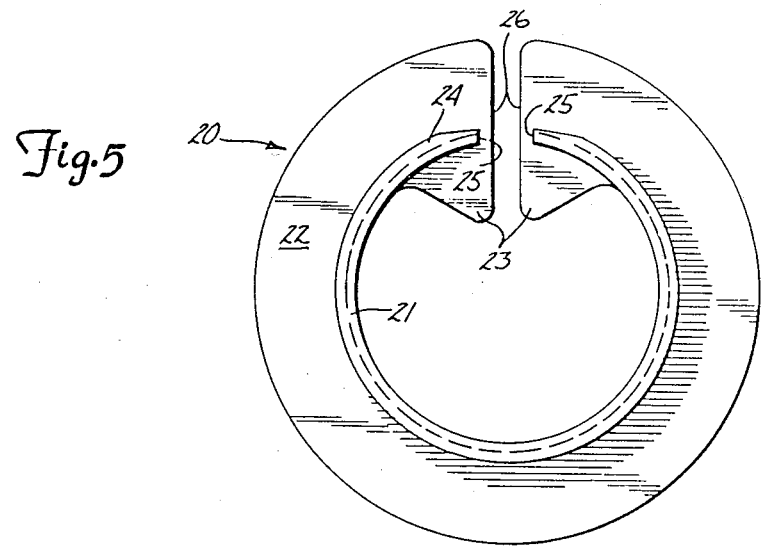
FIG. 5 is a plan view of the retainer of FIG. 2.

FIGS. 2 and 5 depict a preferred configuration of the retainer (20). The retainer (20) has a generally cylindrical body (21) which carries a retaining flange (22) extending radially outwardly from the body (21), and an annular lip (24) spaced axially from the retaining flange and also extending radially outwardly from the body (21). The retaining flange (22) desirably extends outwardly sufficiently far as to effectively prevent the scrub pad (18) from pulling off.

The retainer (20), as will be described more fully below, is provided with a single discontinuity or "split" through its side wall. Adjacent the discontinuity the retainer ends are provided with finger tabs (23) which facilitate removal of the retainer (20). Although FIG. 5 depicts the retainer (20) as having two such tabs (23), a single tab (23) will suffice. As shown in FIGS. 1 and 5, the tabs (23) are preferably co-planar with the retaining flange (22) and extend radially inwardly from the cylindrical body (21). However, any of a variety of configurations and positions of this tab (23) would suffice so long as the tab (23) provides a manual grip to facilitate the removal of the retainer (20), as will be described below.

Figure 3:
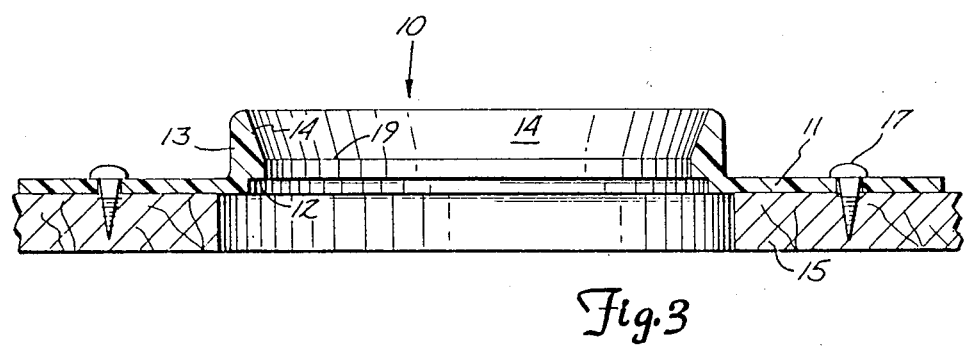
FIG. 3 is an elevational cross-sectional view of a base, shown attached to a drive disc.
Figure 4:
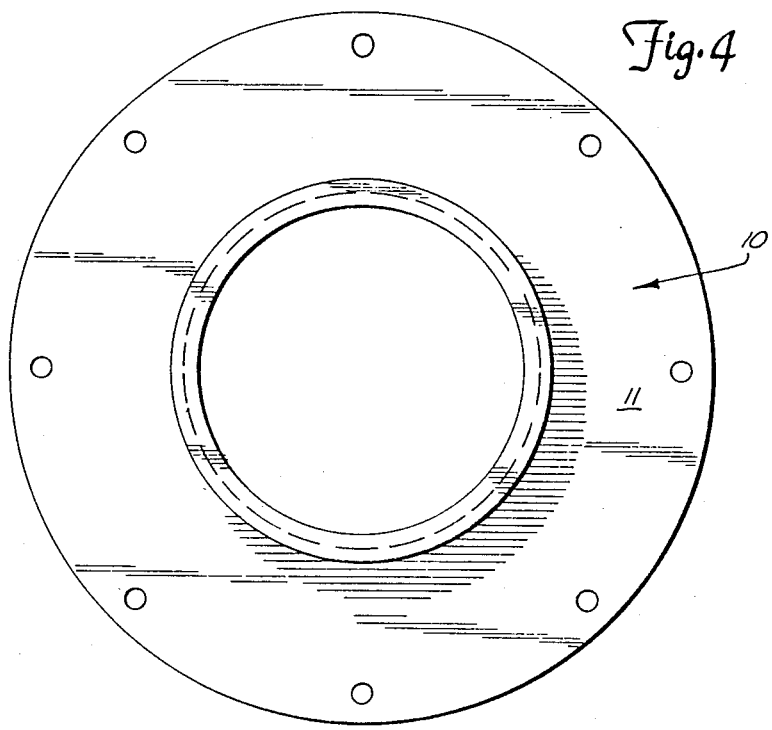
FIG. 4 is a plan view of the base of FIG. 3.

FIGS. 3 and 4 further show the configuration of the base (10). The base (10) is provided with a flange (11) for attachment to the rigid support disc (15). Any traditional attachment means may be used; the base (10) of FIG. 3 typically is attached by wood screws (17) to the drive disc (15). The base (10) also has a collar (13). The collar (13) has an annular shoulder (12) positioned to engage the lip (24) of the retainer (20). The axial length of the collar (13), measured from the shoulder (12) to the other end of the collar (13), is approximately equal to but desirably is slightly less than the distance between the retaining flange (22) and the lip (24) of the retainer (20). Thus, when the retainer (20) and base (10) are assembled, the collar (13) is held between the lip (24) and the retaining flange (22). The ring-shaped body (21) of the retainer (20) is desirably of an outside diameter approximately equal to the inside diameter of the collar (13), allowing the retainer (20) to snugly fit within the collar (13).

FIG. 6 shows the relationship between the two pieces in the assembled configuration. The dimensions of the various parts can be varied significantly to meet the requirements of a particular application. In the embodiment shown in FIGS. 6 and 7 the scrub pad (18) fits snugly but rotatably behind the retaining flange (22). The distance between the base flange (11) and the retaining flange (22) desirably is slightly less than the uncompressed thickness of the scrub pad (18) so that the pad (18) is gripped by the flanges.

FIG. 7 depicts the manner in which the retainer (20) is removed from the base (10) to allow the scrub pad (18) to be changed. By pulling up on the tab (23) with the index finger and simultaneously pushing down with the thumb on the retaining flange (22) across from the tab (23) the cylindrical body (21) will become inclined from the vertical, pivoting about an axis tangent to the cylindrical body (21) and thereby moving the portion of the lip (24) adjacent the discontinuity radially (with respect to the cylindrical body axis) away from the base shoulder (12) freeing it from the shoulder (12). By then pulling the tab (23) axially away from the base (10), the lip (24) will continue to slide off the shoulder (12), allowing the retainer (20) to be "peeled" away from the base (10) in a single motion. To replace the retainer (20), one end of it is positioned so that the lip (24) engages the shoulder (12), and pressure is then applied to the retaining flange (22) in a circular motion beginning with the inserted end and successively around the retainer (20) until the entire length of the lip (24) has engaged the shoulder (12).

Referring again to FIG. 2, the cylindrical body (21) at the discontinuity or split is preferably tapered slightly. The taper allows the split in the retaining flange (22) to be relatively small while providing clearance of the end (25) of the lip (24) adjacent the split past the end (26) of the opposing flange (22) and tab (23) during the insertion and removal procedures.

FIG. 5 shows a preferred embodiment in which the radial thickness of the lip (24) gradually decreases adjacent the discontinuity. This allows the lip (24) to slip past the shoulder (12) more easily during the removal procedure.

In another preferred embodiment the inner surface of the collar (13) is beveled as shown in FIGS. 3, 6 and 7. The beveled portion of the collar therefore defines a camming surface (14) which performs two functions. First, referring to FIG. 7, as the tab (23) is lifted away from the base (10), the retainer body (21) inclines from the vertical. The beveled portion of the collar (14) provides relief to facilitate this procedure. If the bevel does not extend the entire axial length of the collar (13), then the point at which the bevel terminates defines a fulcrum point (19) which assists in prying the lip (24) away from the shoulder (12).

The second function of the beveled camming surface (14) is to assist in the insertion of the retainer (20). As the retainer (20) is being forced into its position, it necessarily must be compressed radially slightly to allow the lip (24) to slip past the shoulder (12) and into position. The camming surface (14) translates axial force which is urging the retainer (20) toward the base (10) into a radially inward force to slightly compress the retainer (20), allowing it to slip into its proper position. This feature allows the insertion procedure to be quick and easy, and, in practice, this feature allows the retainer (20) to be simply pushed on, eliminating the necessity of precisely reversing the removal procedure as described above.

The base (10) may be manufactured from any suitable material which provides the necessary strength and rigidity. The retainer (20) similarly may be manufactured from any of a variety of materials; the retainer (20), however, must have some resiliency to facilitate the above-described removal and insertion procedures. Preferably, both pieces are manufactured from a flexible plastic; although many such plastics could be utilized, a co-polymer acetal resin sold under the trademark "CELCON" has given good results. The parts can be manufactured by well-known techniques, including injection molding.

While a preferred embodiment of the present invention has been described, it should be understood that various changes, adaptations and modifications may be made therein without departing from the spirit of the invention and the scope of the appended claims.

What is claimed is:

1. A pull-apart mounting hub for mounting a pad having a circular mounting hole to a drive disc on a power-driven machine, comprising:
   a base mountable coaxially to the drive disc and having a generally cylindrical collar and an annular shoulder; and
   a generally cylindrical, resilient split-ring retainer including:
      an annular lip extending radially from the retainer and engageable with the annular shoulder of the collar to lock the retainer to the collar; and
      manually operable tab means adjacent the split extending generally radially from the retainer in the opposite direction as the annular lip for resiliently urging the annular lip adjacent the split out of engagement with the annular shoulder of the collar to enable the retainer to be removed from the collar.

2. The mounting hub of claim 1 wherein the collar and retainer respectively include outwardly extending, generally parallel flanges spaced to receive between them the portion of the pad adjacent its circular mounting hole when the retainer is locked to the collar.

3. The mounting hub of claim 1 wherein the exterior surface of the retainer snugly engages the inner surface of the base collar.

4. The mounting hub of claim 2 wherein the inner surface of the collar is tapered outwardly in the axial direction of the retainer flange, said surface defining a camming surface which aids in compressing the retainer radially as the retainer is inserted into the collar.

5. The mounting hub of claim 4 wherein said surface is tapered along only a portion of the collar's axial length, the point at which the taper ceases defining an annular fulcrum which assists in urging the annular lip out of engagement with the collar shoulder as the retainer is removed from the collar.

6. The mounting hub of claim 1 wherein the radial thickness of the annular lip decreases adjacent the split.

7. A pull-apart mounting hub for mounting a pad having a circular mounting hole to a drive disc on a power-driven machine comprising:
- a base mountable coaxially to the support disc and having a cylindrical collar, the collar having an annular shoulder formed therein, and the inner surface of the collar tapering along a portion of its axial length radially outwardly in the direction away from the collar shoulder;
- a generally cylindrical, resilient, split-ring retainer including:
  - a generally cylindrical body;
  - a retaining flange extending radially outwardly from the body;
  - an annular lip, spaced axially from the retaining flange, and formed to be received by the annular shoulder so that the collar is held between the retaining flange and the annular lip; and
  - manually operable tab means adjacent the split extending coplanarly with the retaining flange radially inwardly from the cylindrical body for resiliently urging the annular lip adjacent the split out of engagement with the shoulder of the collar to enable the retainer to be removed from the collar.

8. A pull-apart mounting hub for mounting a pad having a circular mounting hole to a drive disc on a power-driven machine comprising:
- a base mountable coaxially to the drive disc and having a generally cylindrical collar and an annular shoulder; and a retainer including a generally cylindrical body, a flange extending radially outwardly from the body for retaining the pad, and lip means carried by the cylindrical body and extending radially therefrom for engaging the annular shoulder of the collar;
- the cylindrical body of the retainer including at least one discontinuity enabling pivotal movement of at least a portion of the cylindrical body about an axis tangent thereto, and manually operable tab means adjacent the discontinuity extending generally radially from the retainer in the opposite direction from the lip means for resiliently urging said cylindrical body portion to pivot about said axis and to at least partially disengage the lip means from the shoulder.

9. A pull-apart mounting hub for mounting a pad having a circular mounting hold to a drive disc on a power-driven machine, comprising:
- a base mountable coaxially to the drive disc and having a generally cylindrical collar and an annular shoulder; and
- a generally cylindrical, resilient split-ring retainer including:
  - an annular lip engageable with the annular shoulder of the collar to lock the retainer to the collar; and
  - a manually operable tab extending generally radially inwardly from the cylindrical body adjacent the split for resiliently urging the annular lip adjacent the split out of engagement with the annular shoulder of the collar to enable the retainer to be removed from the collar;
- the collar and retainer respectively including outwardly extending, generally parallel flanges spaced to receive between them the portion of the pad adjacent its circular mounting hole when the retainer is locked to the collar, the retainer flange being generally co-planar with the manually operable tab.

* * * * *